United States Patent
Lim et al.

(10) Patent No.: US 8,411,609 B2
(45) Date of Patent: Apr. 2, 2013

(54) METHOD FOR TRANSMITTING AND RECEIVING MULTICAST AND BROADCAST SERVICE

(75) Inventors: Kwang Jae Lim, Daejeon (KR); Jae Sun Cha, Daejeon (KR); Chul Sik Yoon, Seoul (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 532 days.

(21) Appl. No.: 12/766,222

(22) Filed: Apr. 23, 2010

(65) Prior Publication Data

US 2010/0272002 A1 Oct. 28, 2010

(30) Foreign Application Priority Data

Apr. 24, 2009 (KR) .................. 10-2009-0036116
Jun. 24, 2009 (KR) .................. 10-2009-0056593

(51) Int. Cl.
*H04H 20/71* (2008.01)
*H04H 20/74* (2008.01)
*H04W 4/00* (2009.01)

(52) U.S. Cl. ............. 370/312; 455/3.02; 455/422.1

(58) Field of Classification Search .......... 370/312, 370/328–329; 455/3.02, 422.1, 424–425
See application file for complete search history.

(56) References Cited

U.S. PATENT DOCUMENTS

| 7,620,061 | B2 | 11/2009 | Yi et al. | |
|---|---|---|---|---|
| 7,664,070 | B2 | 2/2010 | Van Dervelde et al. | |
| 2004/0184438 | A1* | 9/2004 | Terry | 370/349 |
| 2005/0007971 | A1* | 1/2005 | Jeong et al. | 370/312 |
| 2007/0201467 | A1 | 8/2007 | Kakani | |
| 2009/0274125 | A1* | 11/2009 | Rudolf et al. | 370/336 |
| 2010/0110963 | A1* | 5/2010 | Huang et al. | 370/312 |
| 2011/0070905 | A1* | 3/2011 | Kazmi et al. | 455/507 |
| 2011/0149829 | A1* | 6/2011 | Terry | 370/312 |
| 2012/0026929 | A1* | 2/2012 | Wang et al. | 370/312 |

FOREIGN PATENT DOCUMENTS

| KR | 10-2004-0016066 | 2/2004 |
|---|---|---|
| KR | 10-2007-0009602 | 1/2007 |
| KR | 10-2008-0106407 | 12/2008 |

OTHER PUBLICATIONS

Shweta Shrivastava et al., "Group Scheduling for Improving VoIP Capacity in IEEE 802.16e Networks", IEEE, 2009, pp. 1-5.

* cited by examiner

*Primary Examiner* — Thai Hoang
(74) *Attorney, Agent, or Firm* — Staas & Halsey LLP

(57) ABSTRACT

A terminal receives a map scheduling interval that is set to be greater than a multicast and broadcast service map transmission cycle by a base station from the base station, and receives a multicast and broadcast service map from the base station according to the received map scheduling interval.

8 Claims, 2 Drawing Sheets

METHOD FOR TRANSMITTING AND RECEIVING MULTICAST AND BROADCAST SERVICE

CROSS-REFERENCE TO RELATED APPLICATION

This application claims priority to and the benefit of Korean Patent Application Nos. 10-2009-0036116 and 10-2009-0056593, filed in the Korean Intellectual Property Office on Apr. 24, 2009, and Jun. 24, 2009, respectively, the entire contents of which are incorporated herein by reference.

BACKGROUND OF THE INVENTION (a) Field of the Invention

The present invention relates to a multicast and broadcast service receiving method and transmitting method.

(b) Description of the Related Art

A next process is performed in order to provide the multicast and broadcast service (MBS) through a terminal in the existing mobile communication system such as the IEEE 802.16e.

A base station includes information on the position and transmission method of an MBS zone and an MBS map of a downlink frame in a downlink map, and transmits the same. Therefore, the terminal analyzes the downlink MAP to check the position and transmission method of the MBS zone and the MBS map, and receives the MBS map based on the checking result. Also, the terminal analyzes the MBS map to acquire information on the MBS packet to be received by the terminal, and receives a corresponding packet based on the acquisition to thus receive the MBS service.

In the above-noted prior art, the terminal receives and analyzes the MBS map so as to acquire information on the MBS packet to be received by the terminal each time the base station transmits the MBS map, and hence, the terminal's power consumption is increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an MBS method for reducing the terminal's power consumption.

An exemplary embodiment of the present invention provides a method for a terminal to receive a multicast and broadcast service including: receiving a multicast and broadcast service map scheduling interval that is set to be greater than a multicast and broadcast service transmission cycle of a base station from the base station; receiving a multicast and broadcast service map from the base station according to the multicast and broadcast service map scheduling interval; and receiving the multicast and broadcast service packet based on a position and a transmission method of the multicast and broadcast service packet included in the multicast and broadcast service map.

Another embodiment of the present invention provides a method for a base station to transmit a multicast and broadcast service including: transmitting a multicast and broadcast service map scheduling interval that is set to be greater than a multicast and broadcast service transmission cycle of the base station; transmitting the multicast and broadcast service map based on the multicast and broadcast service transmission cycle; and transmitting a multicast and broadcast packet based on the multicast and broadcast service map.

DETAILED DESCRIPTION OF THE EMBODIMENTS

Figure 1:
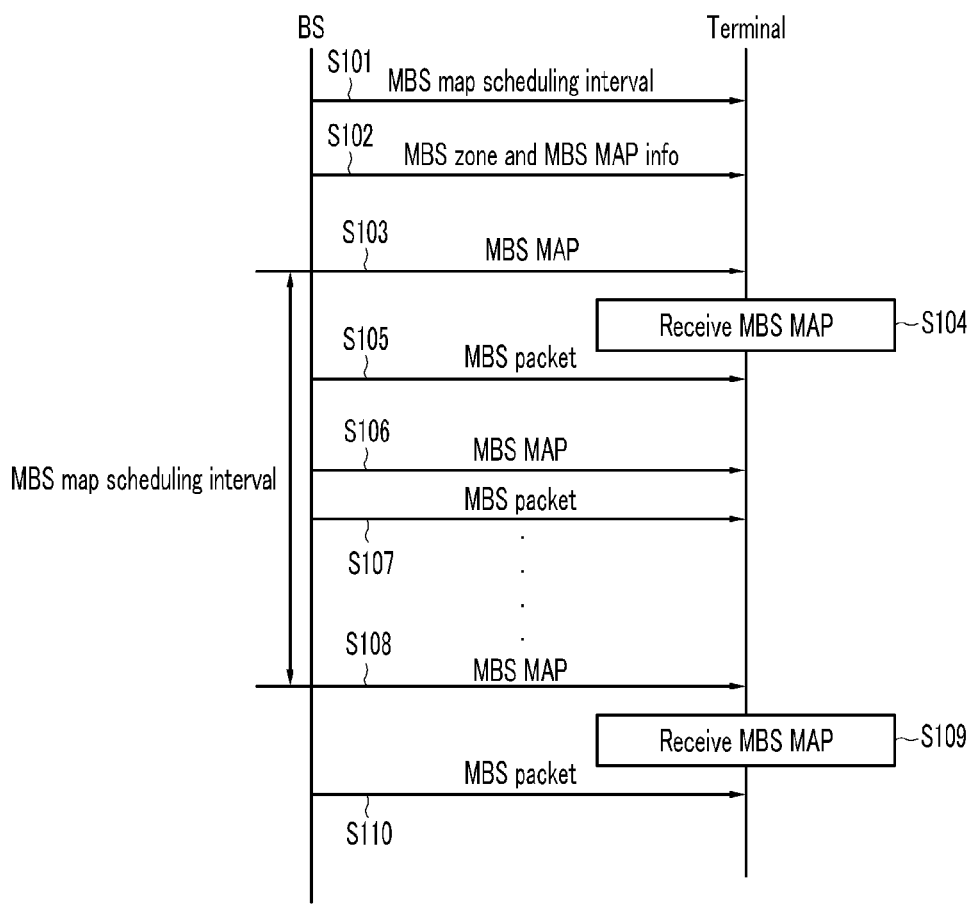
FIG. 1 shows a flowchart of an MBS method according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the specification, a terminal may indicate a mobile station (MS), a mobile terminal (MT), a subscriber station (SS), a portable subscriber station (PSS), user equipment (UE), and an access terminal (AT), and it may include entire or partial functions of the mobile station, the mobile terminal, the subscriber station, the portable subscriber station, the user equipment, and the access terminal.

In the specification, a base station (BS) may indicate an access point (AP), a radio access station (RAS), a nodeB (Node-B), an evolved Node-B (eNB), a base transceiver station (BTS), and a mobile multihop relay (MMR)-BS, and it may include entire or partial functions of the access point, the radio access station, the nodeB, the evolved Node-B, the base transceiver station, and the mobile multihop relay-BS.

A multicast and broadcast service (MBS) receiving and providing method in a mobile communication system according to an exemplary embodiment of the present invention will now be described with reference to accompanying drawings.

FIG. 1 shows a flowchart of an MBS according to an exemplary embodiment of the present invention.

Referring to FIG. 1, the base station transmits an MBS map scheduling interval corresponding to a period in which the MBS MAP including information on the position and transmission method of the MBS packet is updated to the terminal (S101), and the terminal receives it and sets an MBS map scheduling interval on the MBS to be received by the terminal. In this instance, the base station uses a dynamic service addition (DSA) message or a broadcasting channel in order to transmit the MBS map scheduling interval to the terminal. That is, when differently setting the MBS map scheduling interval for respective service types, the base station transmits the MBS map scheduling interval through the DSA message while performing the DSA process for setting the terminal and the MBS, and it transmits the MBS map scheduling interval by using a broadcasting channel when applying the same MBS map scheduling interval to all the services.

The base station transmits the MBS map and a subframe used for the MBS, that is, the MBS information including a position of the MBS zone and a transmission method through the broadcasting channel of the downlink frame (S102), and the terminal receives the same to acquire information on the MB zone corresponding to the MBS to be received by the terminal and the MBS map.

Also, the base station periodically transmits the MBS map through a predetermined subframe of the downlink frame (S103, S106, and S108), and the terminal receives the MBS map from the base station according to a predetermined MBS map scheduling interval (S104 and S109). In this instance, the MBS map scheduling interval is set to be greater than the transmission cycle corresponding a period in which the base station transmit the MBS map.

The terminal analyzes the MBS map to acquire the position and transmission method of the MBS packet each time it receives the MBS map, and receives the MBS packet until receiving the MBS map again based on the acquisition (S105, S107, and S110).

Figure 2:
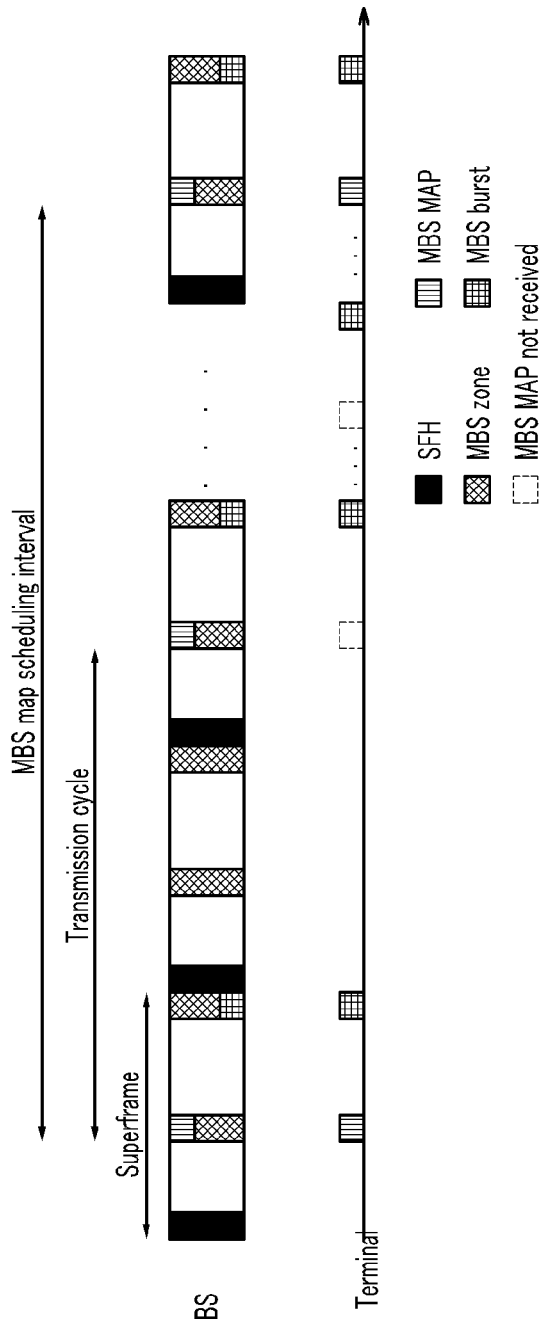
FIG. 2 shows an example for a terminal according to an exemplary embodiment of the present invention to receive an MBS.

FIG. 2 shows an example for a terminal according to an exemplary embodiment of the present invention to receive an MBS.

The downlink frame transmitted by the base station is configured with a superframe including a plurality of subframes, and a superframe header (SFH) is transmitted through the first subframe of the downlink frame.

Also, the superframe header includes a preamble and broadcasting information, the preamble is transmitted through a synchronization channel (SCH), and the broadcasting information is transmitted through two broadcasting channels (BCH). In this instance, the broadcasting channel is classified as a primary broadcast channel (PBCH) and a secondary broadcast channel (SBCH), and MBS information is transmitted through the secondary broadcast channel.

Referring to FIG. 2, the base station periodically transmits the MBS map through the subframe of the downlink frame according to a predetermined MBS map transmission cycle.

However, the terminal receives the MBS map based on the MBS map scheduling interval that is set to be longer than the MBS map transmission cycle instead of receiving the MBS map from the base station. The terminal receives the MBS packet from the base station based on MBS map analysis information.

In general, since the service feature of the MBS is not changed within a predetermined time and a packet is periodically generated, the terminal does not need to receive the MBS maps from the base station. Therefore, the terminal's power consumption is reduced since the terminal receives the MBS map based on the MBS map scheduling interval that is set to be greater than the MBS map transmission cycle of the base station.

According to the embodiment of the present invention, since the terminal does not need to receive the MBS map each time the base station transmits the MBS map, the terminal's power consumption is reduced.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a terminal to receive a multicast and broadcast service, comprising:
    receiving a multicast and broadcast service map scheduling interval that is set to be greater than a multicast and broadcast service transmission cycle of a base station from the base station;
    receiving a multicast and broadcast service map from the base station according to the multicast and broadcast service map scheduling interval; and
    receiving the multicast and broadcast service packet based on a position and a transmission method of the multicast and broadcast service packet included in the multicast and broadcast service map.

2. The method of claim 1, wherein
    the receiving of a multicast and broadcast service map scheduling interval from the base station includes
    receiving the multicast and broadcast service map scheduling interval through a dynamic service additional message.

3. The method of claim 1, wherein
    the receiving of a multicast and broadcast service map scheduling interval from the base station includes
    receiving the multicast and broadcast service map scheduling interval through a broadcasting channel.

4. The method of claim 1, further including
    receiving information including a position and a transmission method of the multicast and broadcast service map from the base station through a broadcasting channel.

5. The method of claim 1, wherein
    the receiving of a multicast and broadcast service packet includes
    receiving the multicast and broadcast service packet based on information included in the multicast and broadcast service map until a next multicast and broadcast service map scheduling interval comes.

6. A method for a base station to transmit a multicast and broadcast service, comprising:
    transmitting a multicast and broadcast service map scheduling interval that is set to be greater than a multicast and broadcast service transmission cycle of the base station;
    transmitting the multicast and broadcast service map based on the multicast and broadcast service transmission cycle; and
    transmitting a multicast and broadcast packet based on the multicast and broadcast service map.

7. The method of claim 6, wherein
    the transmitting of a multicast and broadcast service map scheduling interval includes
    transmitting the multicast and broadcast service map scheduling interval through a dynamic service addition message.

8. The method of claim 6, wherein
    the transmitting of a multicast and broadcast service map scheduling interval includes
    transmitting the multicast and broadcast service map scheduling interval through a broadcasting channel.

* * * * *